US012581163B2

(12) United States Patent
    Nunally

(10) Patent No.: US 12,581,163 B2
(45) Date of Patent: Mar. 17, 2026

(54) SYSTEMS AND METHODS FOR DELIVERING USER SPECIFIC MESSAGES

(71) Applicant: Datum Point Labs Inc., Jackson, WY (US)

(72) Inventor: Patrick Nunally, San Diego, CA (US)

(73) Assignee: Datum Point Labs Inc., Jackson, WY (US)

( * ) Notice: Subject to any disclaimer, the term of this patent is extended or adjusted under 35 U.S.C. 154(b) by 0 days.

(21) Appl. No.: 18/623,834

(22) Filed: Apr. 1, 2024

(65) Prior Publication Data

US 2024/0364967 A1 Oct. 31, 2024

Related U.S. Application Data

(60) Provisional application No. 63/457,696, filed on Apr. 6, 2023.

(51) Int. Cl.
    *H04N 21/45* (2011.01)
    *H04N 21/458* (2011.01)
    *H04N 21/488* (2011.01)

(52) U.S. Cl.
    CPC ....... *H04N 21/4532* (2013.01); *H04N 21/458* (2013.01); *H04N 21/4882* (2013.01)

(58) Field of Classification Search
    CPC ............. H04N 21/4532; H04N 21/458; H04N 21/4882
    See application file for complete search history.

(56) References Cited

U.S. PATENT DOCUMENTS

| | | | | |
|---|---|---|---|---|
| 2008/0194272 A1* | 8/2008 | Smith | ..................... | H04W 4/02 |
| | | | | 725/35 |
| 2020/0162049 A1* | 5/2020 | Cremer | ................... | H03G 3/24 |
| 2021/0281904 A1* | 9/2021 | Calvert | ........... | H04N 21/25841 |
| 2022/0086532 A1* | 3/2022 | Major | ............... | H04N 21/4882 |

* cited by examiner

*Primary Examiner* — Oschta I Montoya
(74) *Attorney, Agent, or Firm* — Buchalter LLP

(57) ABSTRACT

Embodiments described herein provide systems and methods for delivering user specific messages. A system receives a media feed including at least one of an audio feed or a video feed. The system determines, based on the media feed, a categorization of the media feed. The system determines, based on a set of information, a replacement media. The system overrides the media feed with the replacement media based on the categorization.

20 Claims, 8 Drawing Sheets

Output Layer 543

Activation 562

Hidden Layers 542 weight 552

Activation 561 weight 551

Input Layer 541

Neuron 546

Neuron 545

Neuron 544

560

701   Receive a media feed including at least one of an audio feed or a video feed 702   Determine, based on the media feed, a categorization of the media feed 703   Determine, based on a set of information, a replacement media 704   Override the media feed with the replacement media based on the categorization

700

SYSTEMS AND METHODS FOR DELIVERING USER SPECIFIC MESSAGES

CROSS REFERENCE(S)

The instant application is a nonprovisional of and claim priority under 35 U.S.C. 119 to U.S. provisional application No. 63/457,696, filed Apr. 6, 2023, which is hereby expressly incorporated by reference herein in its entirety.

TECHNICAL FIELD

The embodiments relate generally to systems and methods for delivering user specific messages.

BACKGROUND

Existing communication systems such as radio and television are largely one-directional, and do not allow for individualization of messaging or advertisement. Users may be divided into large classes, for example by region, for a form of targeting, but this is unlikely to be well-suited to an individual user's needs. Further, the operators of broadcast channels have control over messaging that is sent to customers. Therefore, there is a need for improved systems and methods for delivering user specific messages.

DETAILED DESCRIPTION

Figure 1:
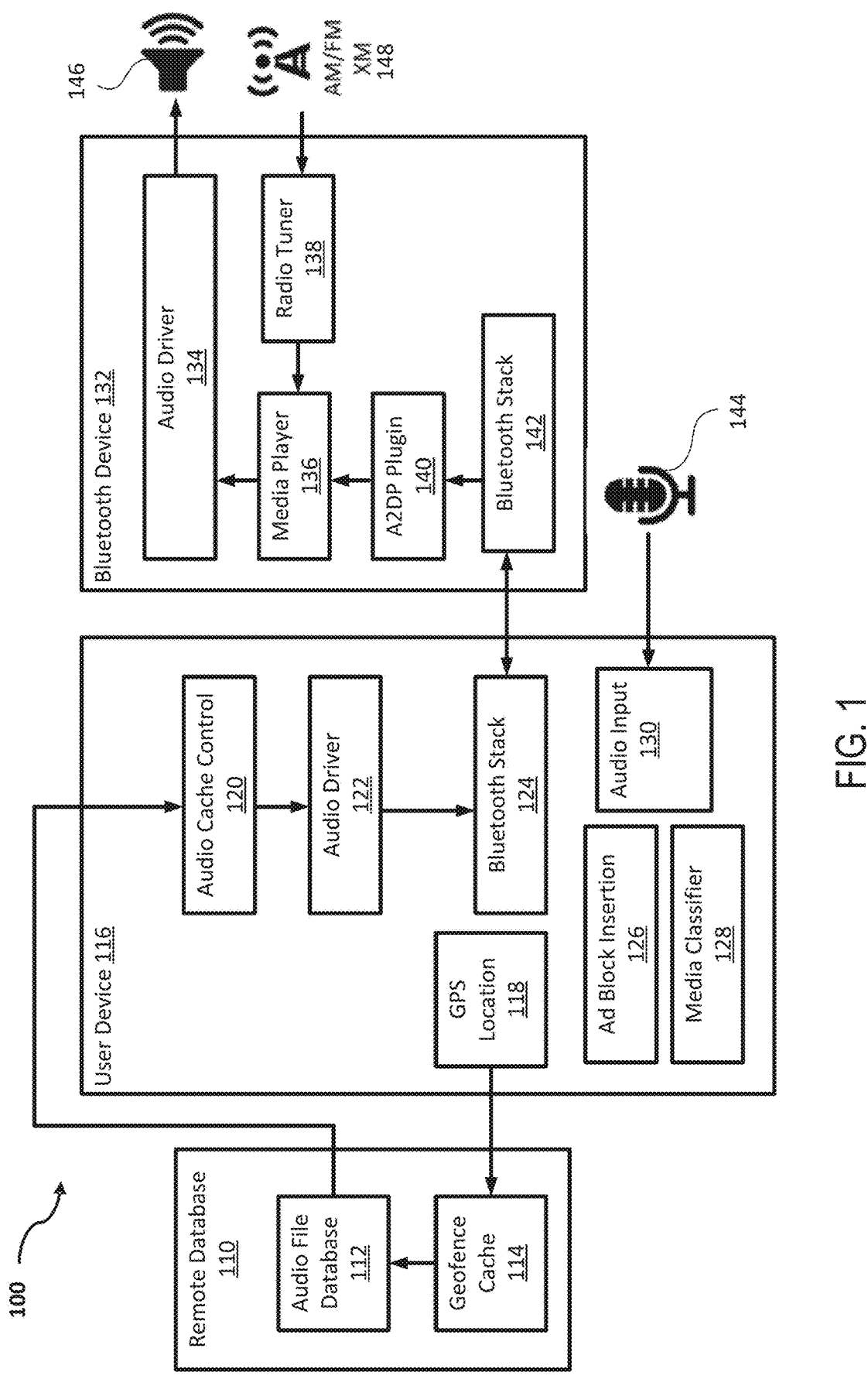
FIG. 1 illustrates a framework for user specific messaging, according to some embodiments.

Existing communication systems such as radio and television are largely one-directional, and do not allow for individualization of messaging or advertisement. Users may be divided into large classes, for example by region, for a form of targeting, but this is unlikely to be well-suited to an individual user's needs. Further, the operators of broadcast channels have control over messaging that is sent to customers.

Embodiments herein include systems and methods for user specific messaging. Embodiments herein take principal advantage of the fact that advertising and/or control data broadcasts must fundamentally convey content to users (effectively the core value and purpose of the media broadcast). Embodiments herein include classification of media by evaluation of baseband content, recognizing that without markup or cooperative encoding of media (audio, image, video) an inherent latency will be required to perceive and classify content in linear broadcast. In many applications such as in vehicle AM radio broadcast buffering of the audio baseband requires a new hardware buffering memory to provide a window of data for active classification which is undesirable in many applications.

Embodiments herein can make use of audio/video digital buffering, however in many cases the change of installed hardware is undesired. Embodiments mimic how a human user would recognize and classify content. Recognition rates are targeted and queues such as announcement of ad breaks or mid ad blocks and breaks into the media stream to add in classification completion of media after start of play. To do this, embodiments herein provide lightweight computer audio/vision techniques typically born in a mobile device such as a mobile phone to implement classification of broadcast media and upon classification inject into the media player via local area network (or other means) such as Bluetooth a media duck where media is overridden by selected media delivered by said alternate local area network.

This allows media content to be utilized and enjoyed and interruptions to said linear media which had been previously dictated by the broadcast channel can now be filled and defeat attempts to obfuscate the presence of ads.

To increase robustness, embodiments herein deliberately ignore all out of band signals or content not perceptible to humans when categorizing audio/video. Instead, visual and or audio is considered as well as behavioral information. For example, an ad may include the precursor "let's take a break" or "we'll be right back" however is some cases will have no precursor so classification will have to be performed fully within the boundaries of an ad block (a grouping of ads played sequentially).

Audio and/or video inserted to replace categorized audio and/or video may be intelligently selected based on a number of factors. For example, geographical location, user preferences, historical user behavior, time of day, etc.

Embodiments herein support overriding media in linear broadcast by classification and insertion of more relevant user data provided into target broadcast period determined to be media content less relevant to user.

Embodiments herein include transmission of more relevant user data provided by an alternative digital channel for insertion into linear media without interrupting the play of media more relevant to user.

Embodiments herein include local user relevance media filters supporting user relevancy in cached media readies for insertion when classification of alternate media relevancy is greater than classification of linear media relevancy.

Embodiments herein include compatible with existing linear and digital broadcast channels, decentralized and/or centralized media sources.

FIG. 1 illustrates a framework 100 for user specific messaging, according to some embodiments. Framework 100 includes a user device 116 (e.g., a mobile phone or other device), a remote database 110, and a Bluetooth device 132. Bluetooth device 132 may be, for example, a car audio system, headphones, or other device. In some embodiments, Bluetooth device 132 communicates with user device 116 by a different communication protocol other than Bluetooth, which is the exemplary interface. In some embodiments, the components and functionality of Bluetooth device 132 are incorporated into user device 116. For example, user device 116 may be used to play music directly via a speaker on user device 116. Examples herein are generally related to audio, but it should be understood that video may be used in connection with audio or independently from audio with substantially the same systems and methods.

Bluetooth device 132 may be configured to play audio and/or video via a display and/or with speaker 146. In the illustrated embodiment, audio driver 134 plays audio over speaker 146 that is provided by media player 136. Media player 136 may played locally stored audio files (not shown), and/or may stream audio from a source such as a radio tuner 138. In some embodiments, radio tuner 138 receives audio transmissions from an AM/FM/XM transmission 148. Media player 136 may also receive audio/video from user device 116 that is intended to override the audio/ video that it is currently playing. For example, media player 136 may receive overriding audio from an advanced audio distribution profile (A2DP) plugin 140. A2DP plugin 140 may receive audio from a Bluetooth stack 142, or any other suitable communication protocol in communication with the corresponding communication interface of user device 116, for example the illustrated Bluetooth stack 124. The overriding audio received by media player 136 may cause media player 136 to decrease the volume of the audio that is currently playing, or completely mute the audio, or pause the audio, such that the overriding audio and/or video may be played over the existing audio/video (e.g., "ducking").

User device 116 may determine when and/or with what audio/video to override a currently playing audio/video. User device 116 may include, for example, a media classifier 128 that is configured to classify what is being played by media player 136. For example, if media player 136 is playing a radio stream from radio tuner 138, media classifier 128 may determine when an advertisement break is occurring. This determination may be made, for example, via a neural-network based model. In order to make the determination, media classifier 128 may receive the same audio/ video stream that is received by media player 136 (e.g., via a Bluetooth connection to Bluetooth device 132), or a compressed version of the audio/video stream. Based on a determination that a predetermined class of media (e.g., an ad break) is occurring, user device 116 may insert audio/ video via ad block insertion 126 to be played over the currently playing audio/video. In this way, rather than a generic audio being played by media player 136, audio that is targeted to a specific user may be played. In some embodiments, user device 116 overrides audio/video independent of a determined media classification. In some embodiments, media classifier 128 determines that the media being used does not include any breaks (e.g., an audio book without ads), and user device 116 may determine based on that classification to insert audio without waiting for a certain break. In some embodiments, media classifier 128 may determine that an audio track change is occurring, and user device 116 may determine to pause the audio and insert overriding audio based on that determination. For example, media classifier 1128 may determine that media player 136 is playing a music album without any ads, but may determine when a track is ending such that the overriding audio is inserted between songs rather than in the middle of a song.

Audio used by user device 116 to override audio/video output may be received from a remote database 110. Remote database 110 may include an audio file database 112 that stores pre-recorded audio and/or video. In some embodiments, remote database 110 automatically generates audio and/or video that is customized for a specific user. For example, a neural network based model on remote database 110 may generate an audio advertisement using a text-to-speech model. The text input to the text-to-speech model may also be generated via a neural network based model (e.g., a large language model) that is given user-specific information. In some embodiments, rather than generating an entire audio, only a portion of the audio is generated on the fly. For example, an advertisement may be pre-recorded, but may have a section of the advertisement for inserting the user's name, and the name may be input automatically via a model. In some embodiments, other information may be automatically inserted. For example, a specific discount may be advertised to a user, where the discount percentage is determined based on historical user information.

In some embodiments, remote database 110 transmits audio/video and/or generates audio/video base on geographic location, as stored locally in a geofence cache 114. Geofence cache 114 may be a local copy of a user's location that is periodically updated from GPS location 118 provided by user device 116. In some embodiments, an advertiser may configure a geographical area in which users may be targeted for specific advertisements in audio file database 112. When a user is within the specified area (as determined by retrieving the location from geofence cache 114), remote database 110 may send the corresponding audio/video file to user device 116 so that user device 116 may use that audio to override the audio/video that the user is currently playing via media player 136.

Audio received by user device 116 may be received by an audio cache control 120. Audio cache control 120 may send audio to an audio driver 122, which may send audio to Bluetooth device 132 via Bluetooth stack 124. The timing of sending the audio may be controlled by ad block insertion 126. In some embodiments, audio data is transmitted to Bluetooth device 132 before it is to be played so that it may be cached and ready to play when triggered by ad block insertion 126, for example also via Bluetooth stack 124.

In some embodiments, user device 116 may gather user information including tracking historical user behaviors. User device 116 may learn user preferences and other second-order knowledge about the user based on directly observed activity. For example, user device 116 may determine the general location of a user's workplace based on the user commuting to that location each weekday. Gathered information may include information based on audio input 130 that retrieves audio input from microphone 144. This may include statements by a user, but may also include other audio-based information. For example, audio input 130 may be used to determine general ambient noise levels, what other media user is exposed to (e.g., radio station being played in a store), or other audio information. Learned information pieces may also include user preferences. User device 116 may store this information locally, and may receive additional user information from other devices. For example, a central server may be used as a repository for user information and preferences, which user device 116 may contribute to and/or receive information from. Additional non-user-specific information may be retrieved by user deice 116 in order to make intelligent decisions, for example current weather data.

Based on gathered information, user device 116 may determine the appropriate audio/video to play via media player 136. The determination may be done completely by user device 116, or may be determined by a central server, or by remote database 110, or a combination of one or more of these devices. For example, user device 116 may determine based on the time of day and the user's location that the user is likely driving home from work, and may also determine that the user typically stops to eat somewhere on the way home. Accordingly user device 116 may query a central server (or perform locally) to determine an appropriate advertisement to provide to the user relating to food options. The determination may be used to indicate to remote database 110 which audio file to retrieve to play for the user. In some embodiments, user device 116 configures remote database 110 to select audio based on geographic location without further information or indication from user device 116.

In some embodiments, the targeted audio/video may be combined with user input (e.g., via audio input 130) so that it is a two-way communication. For example, user device 116 may override a radio signal at media player 136 with a targeted advertisement, and within the targeted advertisement it can ask the user for information such as "if you are interested, say 'I am interested'." If the user says the requested phrase, then additional targeted audio may be played, or some other action may be performed such as emailing or texting the user additional information. The two-way communication may also be customized on the fly based on user information. For example, user device 116 may have access to a user's calendar information, and based on that information may provide the option for the user to schedule an appointment with an advertised business during an open time in their schedule, and the user may confirm via audio input 130.

In some embodiments, user device 116 may also be in communication with a vehicle's system. This communication may provide additional information to user device 116 for targeting. For example, user device 116 may present an advertisement for an oil change service based on a determination that a certain number of miles have passed since the last oil change. For an electric car, information may be provided for charging stations based on the location of the vehicle and remaining battery charge. For example, user device 116 may be provided information about charging stations and their current utilization, and may make recommendations regarding which charging station the user should go to based on that information. In some embodiments, user device 116 may also make changes to a vehicle. For example, a targeted advertisement may override the audio in the vehicle, asking the user if they would like to purchase an additional software-enabled feature for their vehicle. Based on the user's response via audio input 130 or other input, user device 116 may enable that feature on the vehicle. In some embodiments, user device 116 may access information from other applications on user device 116 (e.g., email, calendar, etc) and use that information to make determinations.

Figure 2:
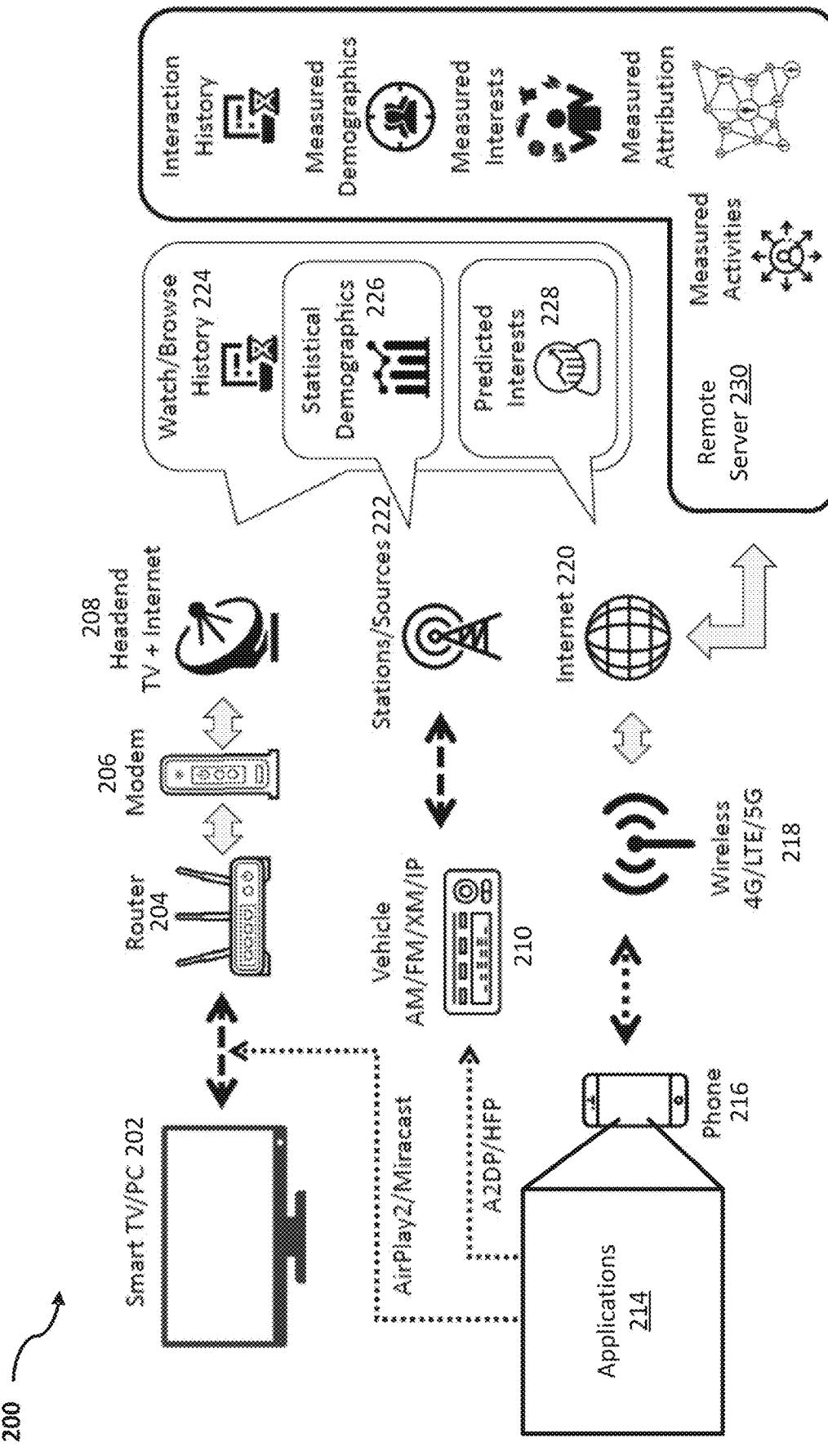
FIG. 2 illustrates a framework for user specific messaging, according to some embodiments.

FIG. 2 illustrates a framework 200 for user specific messaging, according to some embodiments. In some embodiments, framework 200 may include the functionality described with reference to framework 100. For example, phone 216 may be a user device 116, vehicle radio 210 may be a Bluetooth device 132, and remote server 230 may be a remote database 110. Additional features are included herein with reference to framework 200 beyond those described in framework 100.

Framework 200 may include a phone 216 with applications 214, a vehicle radio 210, a television 202, and remote server 230. These components may be utilized in order to provide a user with targeted information that is determined based on user information and/or user interactions with the framework, and is provided to the user via interfaces such as the television 202, radio 210, and/or phone 216.

Applications 214 on phone 216 may provide filtered content delivery based on specific user demographics, interests, activities, media, and exposure and logs of all the above. Phone 216 may connect to internet 220 via internet connection 218 (e.g., LTE, 4G, 5G, or other protocol). Via internet 220, phone 216 may have access to remote server 230 to store and/or retrieve information such as measured activities, measured attribution, measured interests, measured demographics, and/or interaction history. In some embodiments, a measured attribution is the assessment of one or more pre-determined goals for each message. For example—If a system provides a user a message saying "there is a new bookshop near you" and the user goes to that store within 7 days that could be used in an attribution metric, where measured attribution could be that over 1000 listeners 32% of the people that heard the ad visited the new shop. Remote server 230 may also include, and/or have access to, watch/browse history 224, statistical demographics 226, and/or predicted interests 228. This information may be gathered from a variety of sources. For example, user interaction with a phone may be logged, statistical demographics 226 may be retrieved from radio stations/ sources 222, watch/browse history may be retrieved from TV/internet provider 208, etc. Phone 216 may use any of this information (local to phone 216 or on remote server 230) to make determinations regarding when and what to override audio/video with.

Phone 216 may receive media from internet 220 via interface 218, and/or may receive media from a local network (e.g., WiFi) via router 204, and modem 206 that provides access to internet provider 208. Other devices may be connected to the same network, such as television 202. In some embodiments, phone 216 may send audio/video media to television 202 (e.g., screen casting). In some embodiments, television 202 may be playing linear media received via a television provider, and/or streaming media via internet 220. This media on television 202 may be overridden by phone 216 as described with respect to Bluetooth device 132 in framework 100. For example, phone 216 may determine, based on user preferences, etc., to override an advertisement being played on television 202 with a targeted advertisement that is displayed from phone 216. This may include determining (e.g., via media classifier 128), that television 202 is in an ad block. Likewise, radio 210 may have audio overridden by phone 216 as described in framework 100.

In some embodiments, the various components of framework 200 work in conjunction to provide targeted audio/ video to a user. For example, phone 216 may track the location of a user, and track what media is being played on radio 210 by the user. Using this information, phone 216 (or a remotely stored model) may determine that when the same user is watching television 202, that a certain advertisement should be delivered. For example, phone 216 may determine that a user is listening to a Taylor Swift album on radio 210. Based on this determination, phone 216 may override an advertisement on television 202 with an advertisement relating to a Taylor Swift concert provided via a streaming service. Overriding of the audio/video of television 202 may be directly from phone 216, or may be inserted upstream in a video/audio stream as described in further detail with reference to FIG. 3.

In some embodiments, advertisers, or other content providers, may have control over how their audio/video is targeted. For example, framework 200 may provide an interface allowing an advertiser to select the desired demographics and other parameters with which to target advertisements. Based on these selected parameters, phone 216, remote server 230, or some other server, may determine which advertisement to present (e.g., via television 202) to a user. For example, an advertiser may indicate that a certain advertisement audio should be targeted to male users driving home from work between the hours of 6 and 8 when the weather is above 60 degrees Fahrenheit. Parameters may also include secondary learned user information such as user preferences. For example, phone 216 or remote server 230 may determine a user preference for a certain restaurant, or even certain type of restaurant such as seafood, based on their location information. An advertiser may target an advertisement to users that have a learned preference for seafood, independent of how that preference is learned (e.g., location information, user internet searches, etc.).

Figure 3:
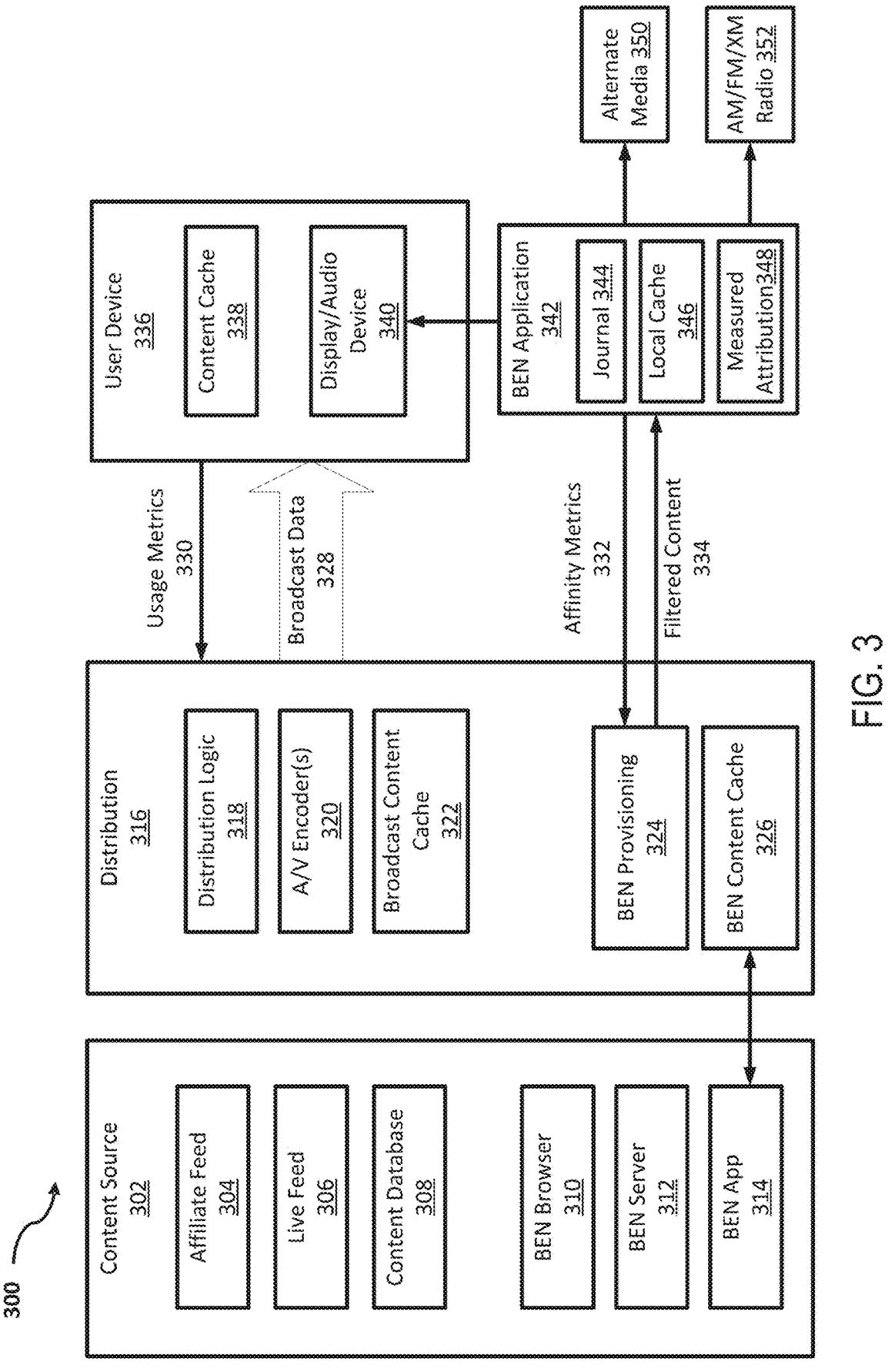
FIG. 3 illustrates a framework for user specific messaging for television, according to some embodiments.

FIG. 3 illustrates a framework 300 for user specific messaging for television, according to some embodiments. Framework 300 includes a content source 302, distribution 316, and user device 336. In general, content source 302 provides media content to user device 336 via distribution 316. Additions to this media delivery model provide the ability to present targeted audio/video to a user via user device 336. In some embodiments, framework 300 may include the same or similar functionality as described in frameworks 100 and 200. For example, content source 302 may be an internet and/or TV provider 208, and user device 336 may be a television 202.

Content source 302 may include one or more of an affiliate feed 304 with syndicated media content, live feed 306, and/or a content database 308. Based on user input, content source 302 may provide one or another of these media sources at a time. For example, content database 308 may be an on-demand video that is communicated only upon a user request. In some embodiments, a live feed 306 is communicated via a broadcast that is always transmitting, and may be ignored or displayed by user device 336 based on the configuration of user device 336. Content source 302 may also include "BEN" components that add the user-specific targeting capability. These components may include a BEN browser 310, BEN server 312, and/or a BEN application 314. These BEN components may receive content from BEN content cache 326 in distribution 316, and may inject that content into the media feed that is transmitted to distribution 316 and subsequently to user device 336. In some embodiments, the content provided by distribution 316 is transmitted only when determined it is to be used as targeted audio/video. In some embodiments, audio/video is provided by distribution 316 to content source 302 so that it is available when later content source 302 determines (or receives an indication from distribution 316 or user device 336) that the audio/video should be injected into the media feed.

In some embodiments, BEN browser 310, BEN server 312, and BEN application 314 together deliver the targeted audio/video content to users. It should be understood that functions described with respect to specific components may be performed by other components or combinations thereof. An exemplary description of functionality of each component follows.

In some embodiments, BEN browser 310 serves as the interface through which users interact with the targeted audio/video content delivery system. BEN browser 310 may operate similarly to a conventional web browser but with specialized functionalities tailored to the delivery of targeted content. The BEN browser 310 may gather user data, preferences, and interactions to feed into the targeting algorithms. BEN browser 310 may provide a platform for users to input preferences, demographics, and other relevant information that will inform the content targeting process. BEN browser 310 may also facilitate the delivery of targeted content received from the BEN server 312.

In some embodiments, BEN server 312 is the central component responsible for processing user data, determining appropriate content targeting strategies, and delivering targeted content to users' devices. BEN server 312 may receive inputs from various sources, including user devices 336, remote servers, and external data sources. BEN server 312 may host algorithms for analyzing user data and generating targeted content recommendations. BEN server 312 may store user profiles, preferences, historical interaction data, and other relevant information necessary for effective targeting. BEN server 312 may communicate with user device 336 to deliver instructions for content overrides or targeted content insertion. Additionally, BEN server 312 may have interfaces for advertisers or content providers to specify targeting criteria.

In some embodiments, BEN application 314 is a software program installed on user devices 336, vehicles or running on a remote server (e.g., content source 302). BEN application 314 may interact with BEN server 312 to receive instructions on content targeting and delivery. BEN application 314 may handle tasks such as intercepting media streams, overlaying targeted content, or modifying playback based on user preferences and targeting criteria. BEN application 314 may include functionalities for monitoring user interactions with targeted content and providing feedback to a separate BEN server (e.g., remote server 230) for further refinement of targeting strategies. BEN application 314 may also include user interfaces for adjusting targeting settings, managing preferences, or opting out of targeted content delivery.

Distribution 316 may include distribution logic 318 that determines how media is distributed to different user devices. Distribution 316 may also include A/V encoders 320 to put audio/video into the correct format to be consumed by a user device 336. Distribution 316 may also include a broadcast content cache 322 for buffering broadcast media audio/video. In some embodiments, distribution 316 is a broadcast services management platform that provides resources for signaling, announcements, timing & scheduling, watermark synchronization, metrics management, dynamic provisioning, app packaging, non-real time (NRT) data delivery, etc. Distribution 316 may communicate data to user device 336 via broadcast data 328. Broadcast data 328 may take a variety of forms, either solely or as configured differently over time. For example, broadcast data 328 may include internet-based media distribution. Internet-based media distribution may also be combined with the ability to receive back from user device 335 usage metrics 330, that may be utilized in the content-targeting features described herein. In another example, broadcast data 328 may include an Advanced Television Systems Committee (ATSC) broadcast. An ATSC broadcast may include varying levels of bandwidth, with corresponding levels of reach. For example, a high bandwidth broadcast may have only limited reach compared to a more narrow bandwidth broadcast. In another example, broadcast data 328 may include multichannel video programming distributor (MVPD) provisioning.

Distribution 316 may also include "BEN" components that enhance the user-targeting capabilities. For example, BEN provisioning 324 may transmit filtered content to a user device 336, for example to a corresponding BEN application 324, such that the filtered content may be used to override the broadcast data on display/audio device 340. BEN provisioning 324 may also inject targeted video/audio into broadcast data 328. For example, broadcast content cache 322 may be modified by BEN provisioning 324 to override broadcast advertisements with targeted advertisements. In some embodiments, BEN provisioning 324 may inject targeted audio/video into broadcast data 328 by utilizing a different audio/video source for broadcast data temporarily. For example, BEN provisioning 324 may provide an indication to distribution logic 318, and distribution logic 318 in response may broadcast audio/video from BEN content cache 326 temporarily rather than data in broadcast content cache 322.

In some embodiments, BEN provisioning 324 provides indexing and filtering of both user and content parameters based on preferences, demographics, and psychographic metrics to affect the targeting capabilities of the content delivery framework 300. By tailoring content to individual user profiles, BEN provisioning 324 aims to improve user engagement, relevance, and satisfaction with the delivered content.

User device 336 may include a content cache 338 that may provide a local memory buffer for media that is being played via user device 336. User device 336 may also include a display/audio device 340 (e.g., a screen, speaker, etc.) with which to display the media feed and/or overriding media. For example, display/audio device 340 may receive audio/video data from content cache 338, or broadcast data 328, or from BEN application 342.

BEN application 342 may be an application on User device 336, or on some other device (e.g., a mobile device such as phone 216, or user device 116). BEN application 342 may provide overriding audio/video, such as the overriding audio/video described in FIGS. 1-2. BEN application 342 may include a journal 344 that tracks historical user behavior that may be used by BEN application 342 in determining user preferences and/or targeting audio/video. BEN application 342 may also include a local cache 346 that may locally store in memory targeted audio/video before it is sent to display/audio device 340. BEN application 342 may also include measured attribution 348. Functionality described herein with reference to BEN application 342 may, in some embodiments, be performed by content source 302, or other system that utilizes information in targeting audio/video messages to specific users.

BEN application 342 may send affinity metrics 332 to a BEN provisioning application 324 on distribution 316. The affinity metrics 332 may include, for example, user preferences learned from user behavior or other gathered user information. Affinity metrics may also include information learned by monitoring user behavior, such as eye tracking, audio input, etc.). For example, BEN application 342 may determine that when certain advertisements are played, a user tends to talk over those advertisements based on an audio input, and that information (or a summary of that information) may be relayed via affinity metrics 332. Affinity metrics 332 may be used by distribution 316 and/or content source 302 for determining which audio/video files to provide to user device 336 as targeting the user.

The determinations for when a specific audio/video should be provided, whether determined by content source 302, distribution 316, user device 336, or other device, may be determined as described with respect to frameworks 100 and 200 in FIGS. 1-2. In some embodiments, when it is determined to provide overriding audio/video, BEN application 342 may directly override the display/audio device with audio/video from local cache 346 or some other source. In some embodiments, based on a determination to override audio/video, BEN application 342 may indicate via BEN provisioning 324, and BEN provisioning 324 may inject the replacement audio/video in broadcast data 328. In this way, the audio/video feed being presented on display/audio device 340 may be relatively uninterrupted and the transition to targeted information may be completely transparent to a user.

BEN application 342 may also be in communication with alternate media 350. For example, alternate media 350 may be a mobile device that may display information related to what the user is watching via display/audio device 340. This may be another method for providing targeted information to a user in a way that may be less disruptive to the broadcast media. Likewise, BEN application 342 may be connected to an AM/FM/XM radio 352, and may provide targeted audio via radio 352. BEN application 342 may also receive information from a central server, similar to remote server 230 in framework 200, for making targeting determinations.

Figure 4:
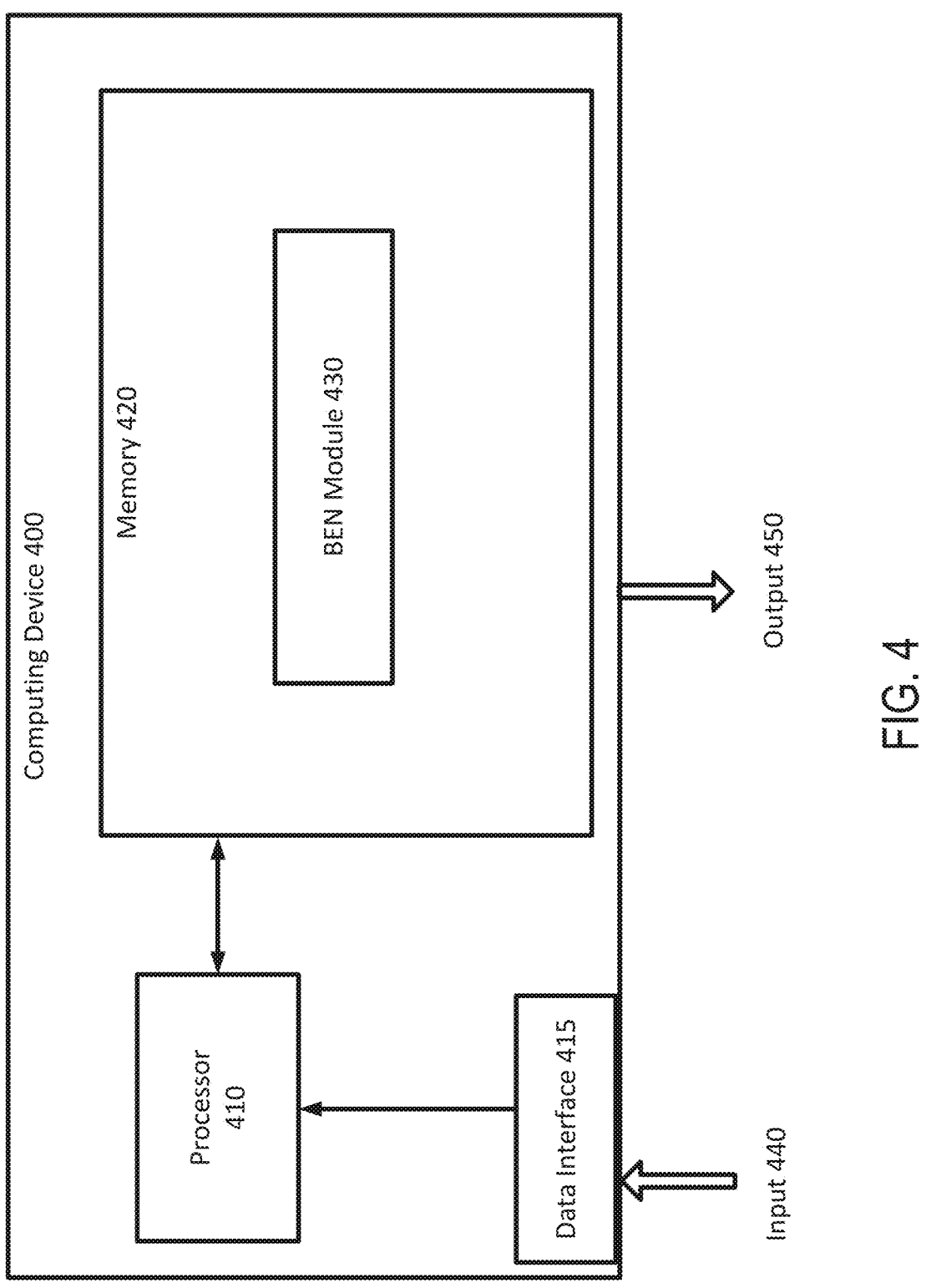
FIG. 4 is a simplified diagram illustrating a computing device implementing the framework described herein, according to some embodiments.

FIG. 4 is a simplified diagram illustrating a computing device 400 implementing the framework described herein, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of transitory or non-transitory machine-readable media (e.g., computer-readable media). Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for BEN module 430 that may be used to implement and/or emulate the systems and models, and/or to implement any of the methods described further herein.

BEN module 430 may receive input 440 such as user input, training data, model parameters, audio, text, etc. and generate an output 450 such as an overriding audio and/or video. For example, BEN module 430 may be configured to determine when audio/video is able to be overridden, select an appropriate replacement based on a number of factors as described herein, and causing that audio/video to override an existing stream.

The data interface 415 may comprise a communication interface, a user interface (such as a voice input interface, a graphical user interface, and/or the like). For example, the computing device 400 may receive the input 440 from a networked device via a communication interface. Or the computing device 400 may receive the input 440, such as user inputs, from a user via the user interface.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5:
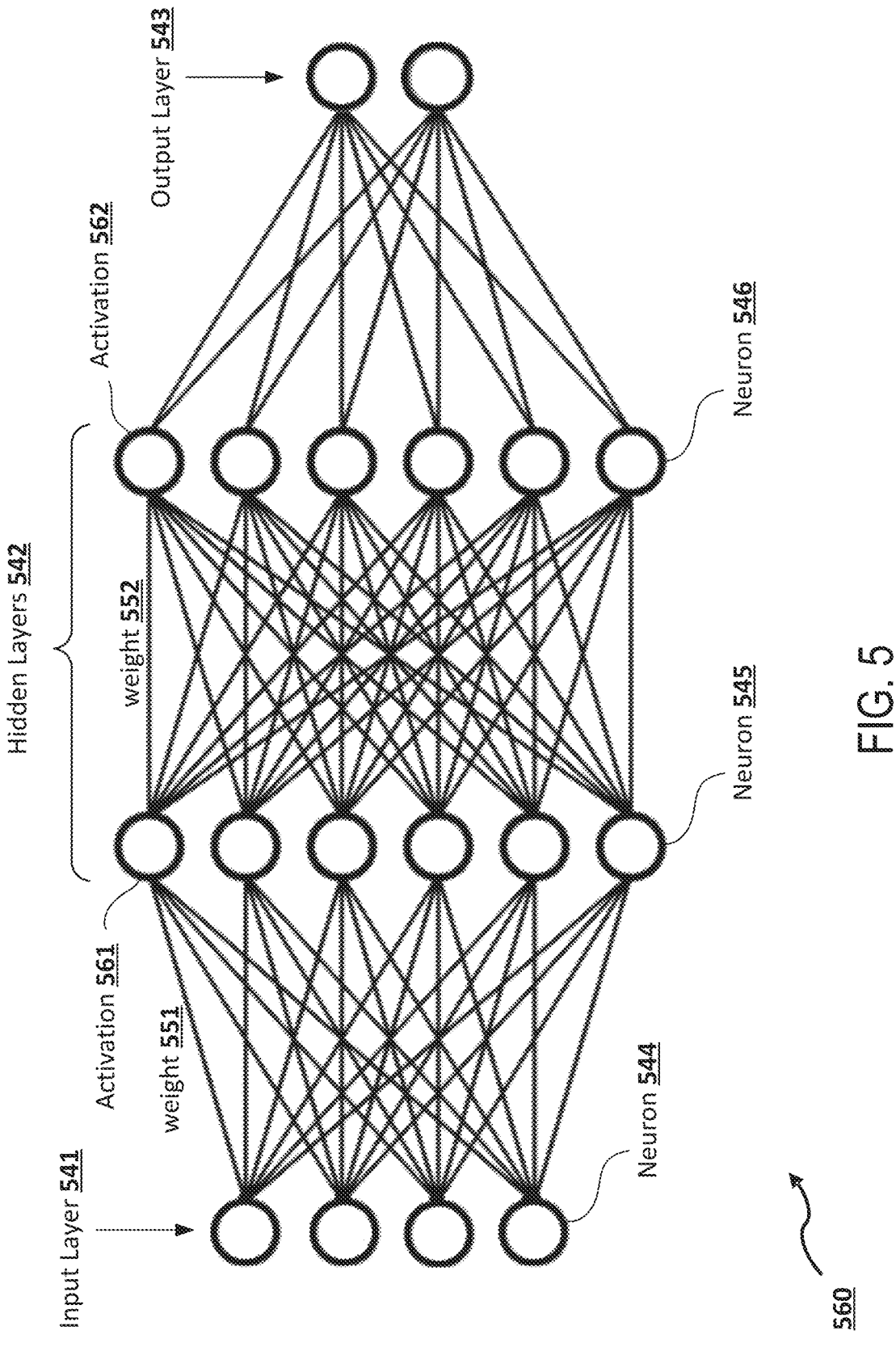
FIG. 5 is a simplified diagram illustrating a neural network structure, according to some embodiments.

FIG. 5 is a simplified diagram illustrating the neural network structure, according to some embodiments. In some embodiments, the BEN module 430 may be implemented at least partially via an artificial neural network structure shown in FIG. 5. The neural network comprises a computing system that is built on a collection of connected units or nodes, referred to as neurons (e.g., 544, 545, 546). Neurons are often connected by edges, and an adjustable weight (e.g., 551, 552) is often associated with the edge. The neurons are often aggregated into layers such that different layers may perform different transformations on the respective input and output transformed input data onto the next layer.

For example, the neural network architecture may comprise an input layer 541, one or more hidden layers 542 and an output layer 543. Each layer may comprise a plurality of neurons, and neurons between layers are interconnected according to a specific topology of the neural network topology. The input layer 541 receives the input data such as training data, user input data, vectors representing latent features, etc. The number of nodes (neurons) in the input layer 541 may be determined by the dimensionality of the input data (e.g., the length of a vector of the input). Each node in the input layer represents a feature or attribute of the input.

The hidden layers 542 are intermediate layers between the input and output layers of a neural network. It is noted that two hidden layers 542 are shown in FIG. 5 for illustrative purpose only, and any number of hidden layers may be utilized in a neural network structure. Hidden layers 542 may extract and transform the input data through a series of weighted computations and activation functions.

For example, as discussed in FIG. 4, the BEN module 430 receives an input 440 and transforms the input into an output 450. To perform the transformation, a neural network such as the one illustrated in FIG. 5 may be utilized to perform, at least in part, the transformation. Each neuron receives input signals, performs a weighted sum of the inputs according to weights assigned to each connection (e.g., 551, 552), and then applies an activation function (e.g., 561, 562, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 541 is transformed into rather different values indicative data characteristics corresponding to a task that the neural network structure has been designed to perform.

The output layer 543 is the final layer of the neural network structure. It produces the network's output or prediction based on the computations performed in the preceding layers (e.g., 541, 542). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the BEN module 430 may comprise the transformative neural network structure of layers of neurons, and weights and activation functions describing the non-linear transformation at each neuron. Such a neural network structure is often implemented on one or more hardware processors 410, such as a graphics processing unit (GPU).

In one embodiment, the BEN module 430 may be implemented by hardware, software and/or a combination thereof. For example, the BEN module 430 may comprise a specific neural network structure implemented and run on various hardware platforms 560, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 560 used to implement the neural network structure is specifically configured based on factors such as the complexity of the neural network, the scale of the tasks (e.g., training time, input data scale, size of training dataset, etc.), and the desired performance.

In one embodiment, the neural network based BEN module 430 may be trained by iteratively updating the underlying parameters (e.g., weights 551, 552, etc., bias parameters and/or coefficients in the activation functions 561, 562 associated with neurons) of the neural network based on a loss function. For example, during forward propagation, the training data such as real or synthetic user behavior and/or preferences are fed into the neural network. The data flows through the network's layers 541, 542, with each layer performing computations based on its weights, biases, and activation functions until the output layer 543 produces the network's output 550. In some embodiments, output layer 543 produces an intermediate output on which the network's output 550 is based.

The output generated by the output layer 543 is compared to the expected output (e.g., a "ground-truth" such as the corresponding audio/video, and/or identifying metadata associated with the audio/video) from the training data, to compute a loss function that measures the discrepancy between the predicted output and the expected output. Given a loss function, the negative gradient of the loss function is computed with respect to each weight of each layer individually. Such negative gradient is computed one layer at a time, iteratively backward from the last layer 543 to the input layer 541 of the neural network. These gradients quantify the sensitivity of the network's output to changes in the parameters. The chain rule of calculus is applied to efficiently calculate these gradients by propagating the gradients backward from the output layer 543 to the input layer 541.

Parameters of the neural network are updated backwardly from the last layer to the input layer (backpropagating) based on the computed negative gradient using an optimization algorithm to minimize the loss. The backpropagation from the last layer 543 to the input layer 541 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as new user data.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

The neural network illustrated in FIG. 5 is exemplary. For example, different neural network structures may be utilized, and additional neural-network based or non-neural-network based component may be used in conjunction as part of module 430. For example, a text input may first be embedded by an embedding model, a self-attention layer, etc. into a feature vector. The feature vector may be used as the input to input layer 541. Output from output layer 543 may be output directly to a user or may undergo further processing. For example, the output from output layer 543 may be decoded by a neural network based decoder. The neural network illustrated in FIG. 500 and described herein is representative and demonstrates a physical implementation for performing the methods described herein.

Through the training process, the neural network is "updated" into a trained neural network with updated parameters such as weights and biases. The trained neural network may be used in inference to perform the tasks described herein, for example those performed by module 430. The trained neural network thus improves neural network technology in delivering user specific messages.

Figure 6:
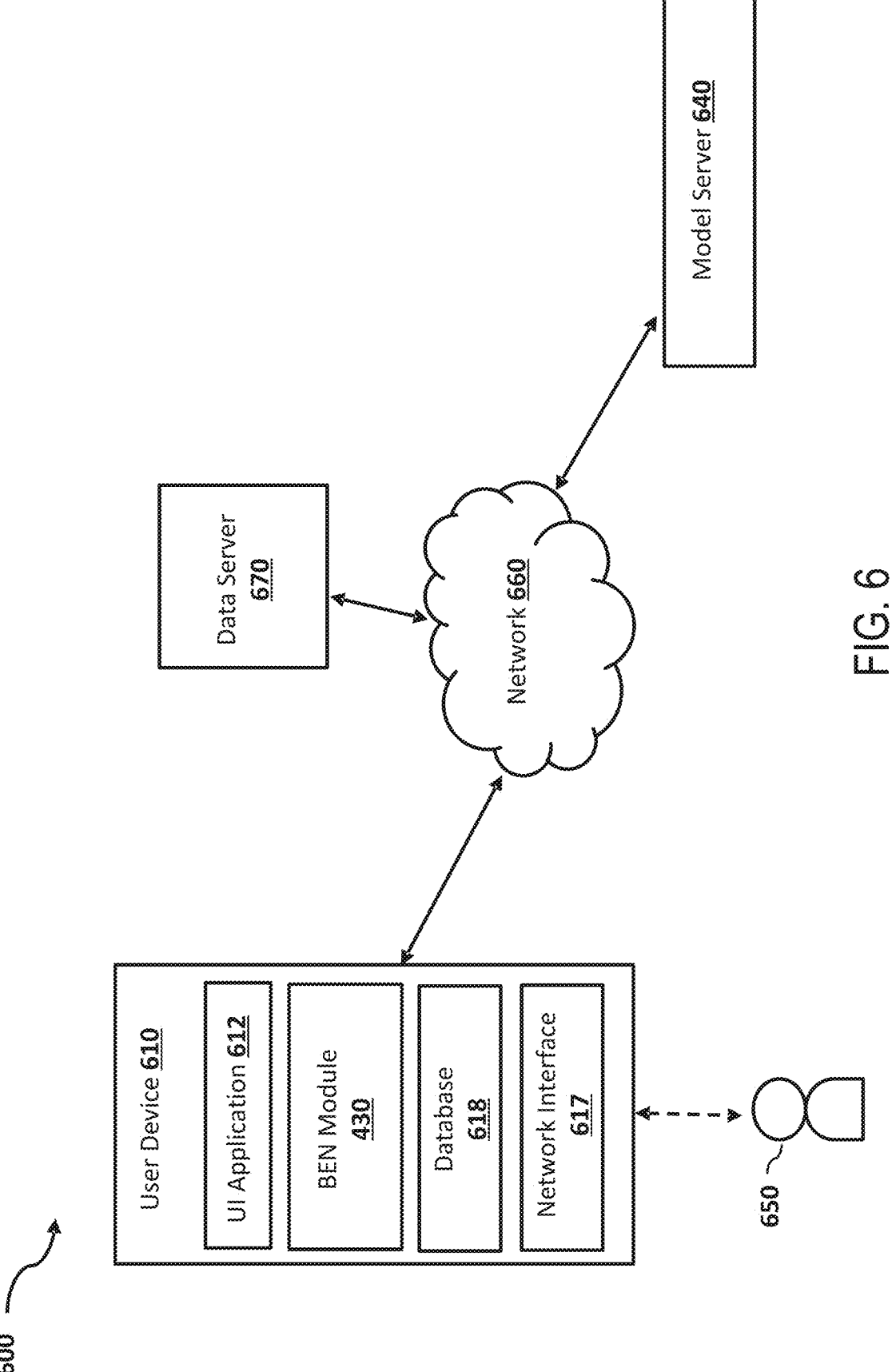
FIG. 6 is a simplified block diagram of a networked system suitable for implementing the framework described herein.

FIG. 6 is a simplified block diagram of a networked system 600 suitable for implementing the framework described herein. In one embodiment, system 600 includes the user device 610 (e.g., computing device 400) which may be operated by user 650, data server 670, model server 640, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4, operating an OS such as a MICROSOFT® OS, a UNIX® OS, a LINUX® OS, a real-time operation system (RTOS), or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities. In some embodiments, user device 610 is used in training neural network based models. In some embodiments, user device 610 is used in performing inference tasks using pre-trained neural network based models (locally or on a model server such as model server 640).

User device 610, data server 670, and model server 640 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660. User device 610, data server 670, and/or model server 640 may be a computing device 400 (or similar) as described herein.

In some embodiments, all or a subset of the actions described herein may be performed solely by user device 610. In some embodiments, all or a subset of the actions described herein may be performed in a distributed fashion by various network devices, for example as described herein.

User device 610 may be implemented as a communication device that may utilize appropriate hardware and software configured for wired and/or wireless communication with data server 670 and/or the model server 640. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLER. Although only one communication device is shown, a plurality of communication devices may function similarly.

User device 610 of FIG. 6 contains a user interface (UI) application 612, and BEN module 430, which may correspond to executable processes, procedures, and/or applications with associated hardware. For example, the user device 610 may provide targeted messages to a user based on a number of factors. In other embodiments, user device 610 may include additional or different modules having specialized hardware and/or software as required.

In various embodiments, user device 610 includes other applications as may be desired in particular embodiments to provide features to user device 610. For example, other applications may include security applications for implementing client-side security features, programmatic client applications for interfacing with appropriate application programming interfaces (APIs) over network 660, or other types of applications. Other applications may also include communication applications, such as email, texting, voice, social networking, and IM applications that allow a user to send and receive emails, calls, texts, and other notifications through network 660.

Network 660 may be a network which is internal to an organization, such that information may be contained within secure boundaries. In some embodiments, network 660 may be a wide area network such as the internet. In some embodiments, network 660 may be comprised of direct physical connections between the devices. In some embodiments, network 660 may represent communication between different portions of a single device (e.g., a communication bus on a motherboard of a computation device).

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

User device 610 may further include database 618 stored in a transitory and/or non-transitory memory of user device 610, which may store various applications and data (e.g., model parameters) and be utilized during execution of various modules of user device 610. Database 618 may store user information, preferences, behavior tracking data, etc. In some embodiments, database 618 may be local to user device 610. However, in other embodiments, database 618 may be external to user device 610 and accessible by user device 610, including cloud storage systems and/or databases that are accessible over network 660 (e.g., on data server 670).

User device 610 may include at least one network interface component 617 adapted to communicate with data server 670 and/or model server 640. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data Server 670 may perform some of the functions described herein. For example, data server 670 may store a training dataset including real or synthetic user data and preferences, etc. Data server 670 may provide data to user device 610 and/or model server 640. For example, training data may be stored on data server 670 and that training data may be retrieved by model server 640 while training a model stored on model server 640.

Model server 640 may be a server that hosts models described herein. Model server 640 may provide an interface via network 660 such that user device 610 may perform functions relating to the models as described herein (e.g., determining when and what information to provide to a user). Model server 640 may communicate outputs of the models to user device 610 via network 660. User device 610 may display model outputs, or information based on model outputs, via a user interface to user 650.

Figure 7:
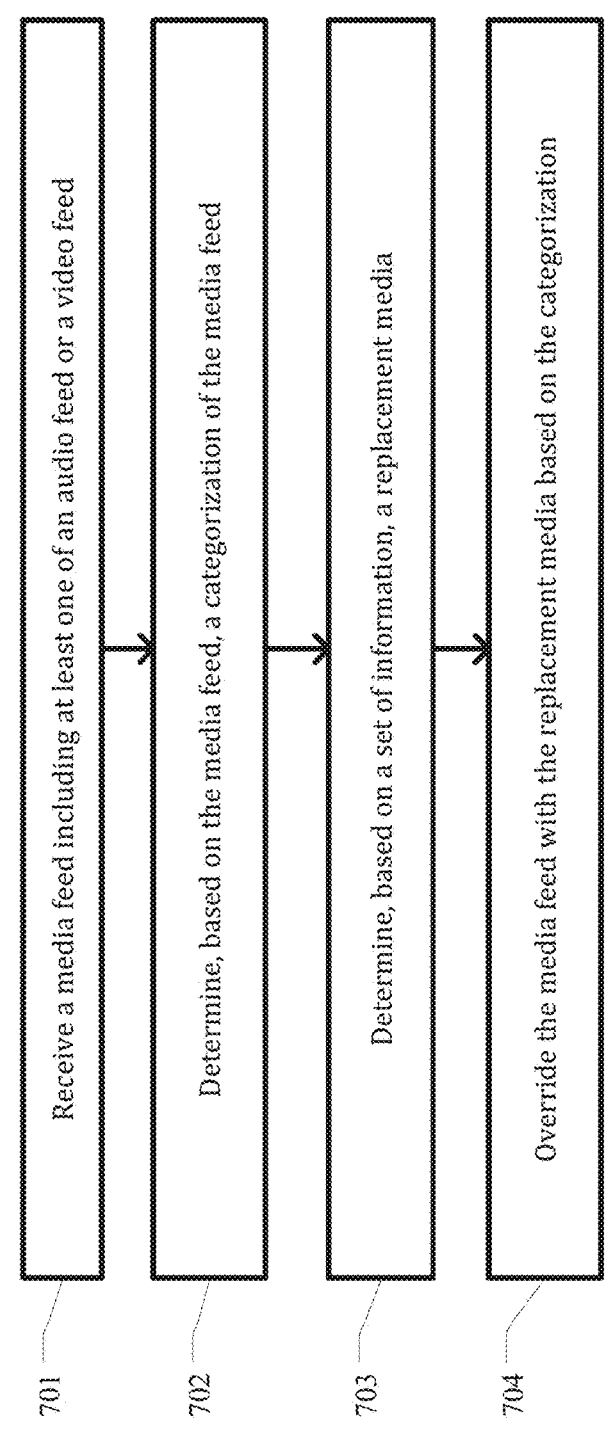
FIG. 7 is an example logic flow diagram, according to some embodiments.

FIG. 7 is an example logic flow diagram, according to some embodiments described herein. One or more of the processes of method 700 may be implemented, at least in part, in the form of executable code stored on non-transitory, tangible, machine-readable media that when run by one or more processors may cause the one or more processors to perform one or more of the processes (e.g., computing device 400). In some embodiments, method 700 corresponds to the operation of the BEN module 430 that performs delivery of user specific messages.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, a system (e.g., user device 116, phone 216, BEN application 342, computing device 400, user device 610, device 800, or device 815) receives a media feed (e.g., media played by media player 136, or broadcast data 328), including at least one of an audio feed or a video feed. The media feed may be, for example, a radio feed broadcast to a radio, or a television broadcast for a television. In some embodiments, the media feed is broadcast from a radio station to a radio. The reception of the media feed by the system may be directly from the same radio source, or may be provided indirectly by another component (e.g., a media player). In some embodiments, the media feed is broadcast from a distribution server (e.g., distribution 316) to a television (e.g., user device 336, display/audio device 340, or television 202). In some embodiments, the overriding the media feed includes providing an indication to the distribution server.

At step 702, the system determines based on the media feed, a categorization of the media feed (e.g., by media classifier 128). In some embodiments, the categorization indicates a start of an advertisement break in the media feed. In some embodiments, the categorization indicates the start of a new audio track. In some embodiments, the categorization indicates the general category of media, for example an audio book, music played from a local copy, streaming audio from a streaming service, radio, etc.

At step 703, the system determines, based on a set of information, a replacement media (e.g., from audio file database 112, BEN content cache 326, etc.). In some embodiments, the replacement media includes at least one of an audio file or a video file. In some embodiments, the set of information includes at least one of: historical user behaviors, learned user preferences, user demographics, user location, or time of day. In some embodiments, the set of information is retrieved from a central data server (e.g., remote server 230, or data server 670).

At step 704, the system overrides the media feed with the replacement media based on the categorization. In some embodiments, overriding includes reducing or completely muting a volume of the media feed. In some embodiments, overriding includes replacing the media feed with an alternative data source. In some embodiments, overriding includes pausing the media feed. In some embodiments, overriding the media feed includes configuring a content source server (e.g., remote database 110) with a geographical boundary (e.g., as stored in geofence cache 114). In some embodiments, overriding includes indicating user location (e.g., GPS location 118) to the content source server.

Figures 8A, 8B:
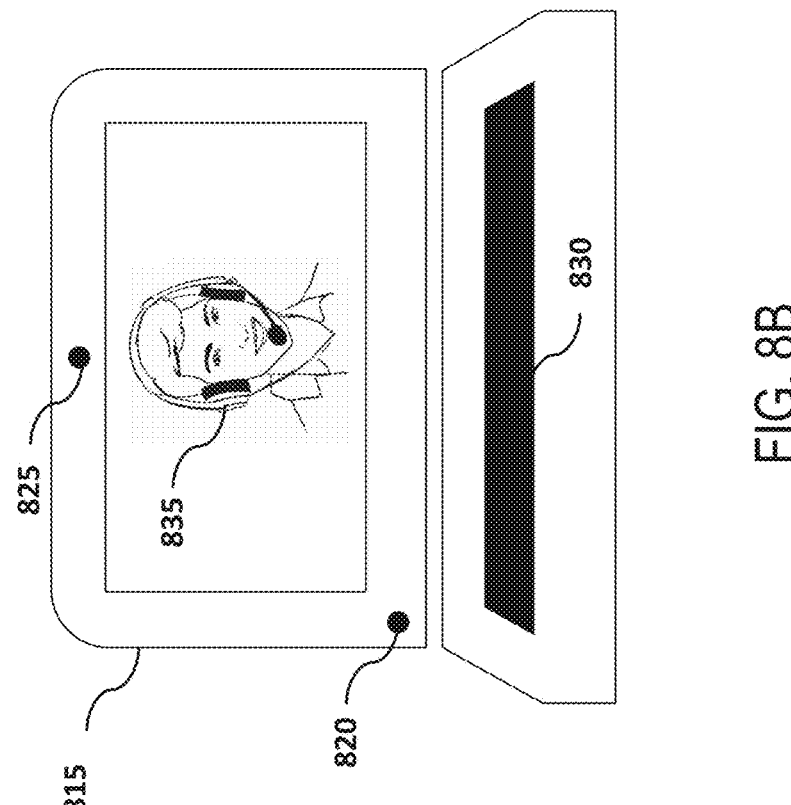
FIGS. 8A-8B are exemplary devices with digital avatar interfaces, according to some embodiments.

FIG. 8A is an exemplary device 800 with a digital avatar interface, according to some embodiments. Device 800 may be, for example, a kiosk that is available for use at a store, a library, a transit station, etc. Device 800 may display a digital avatar 810 on display 805. In some embodiments, a user may interact with the digital avatar 810 as they would a person, using voice and non-verbal gestures. Digital avatar 810 may interact with a user via digitally synthesized gestures, digitally synthesized voice, etc.

Device 800 may include one or more microphones, and one or more image-capture devices (not shown) for user interaction. Device 800 may be connected to a network (e.g., network 660). Digital Avatar 810 may be controlled via local software and/or through software that is at a central server accessed via a network. For example, an AI model may be used to control the behavior of digital avatar 810, and that AI model may be run remotely. In some embodiments, device 800 may be configured to perform functions described herein (e.g., via digital avatar 810). For example, device 800 may perform one or more of the functions as described with reference to computing device 400 or user device 610. For example, device 800 may display digital avatar 810 to provide targeted information to a user over-riding media that is otherwise being presented on device 800, according to methods described herein.

FIG. 8B is an exemplary device 815 with a digital avatar interface, according to some embodiments. Device 815 may be, for example, a personal laptop computer or other com-puting device. Device 815 may have an application that displays a digital avatar 835 with functionality similar to device 800. For example, device 815 may include a micro-phone 820 and image capturing device 825, which may be used to interact with digital avatar 835. In addition, device 815 may have other input devices such as a keyboard 830 for entering text.

Digital avatar 835 may interact with a user via digitally synthesized gestures, digitally synthesized voice, etc. In some embodiments, device 815 may be configured to per-form functions described herein (e.g., via digital avatar 835). For example, device 815 may perform one or more of the functions as described with reference to computing device 400 or user device 610. For example, device 815 may display digital avatar 835 to provide targeted information to a user overriding media that is otherwise being presented on device 815, according to methods described herein.

The devices described above may be implemented by one or more hardware components, software components, and/or a combination of the hardware components and the software components. For example, the device and the components described in the exemplary embodiments may be imple-mented, for example, using one or more general purpose computers or special purpose computers such as a processor, a controller, an arithmetic logic unit (ALU), a digital signal processor, a microcomputer, a field programmable gate array (FPGA), a programmable logic unit (PLU), a microproces-sor, or any other device which executes or responds instruc-tions. The processing device may perform an operating system (OS) and one or more software applications which are performed on the operating system. Further, the process-ing device may access, store, manipulate, process, and generate data in response to the execution of the software. For ease of understanding, it may be described that a single processing device is used, but those skilled in the art may understand that the processing device includes a plurality of processing elements and/or a plurality of types of the processing element. For example, the processing device may include a plurality of processors or include one processor and one controller. Further, another processing configuration such as a parallel processor may be implemented.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a com-puter are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

A computer program implementing aspects of embodi-ments described herein (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the pro-gram in question, or in multiple coordinated files (for example, files that store one or more modules, sub-pro-grams, or portions of code). A computer program can be executed on one computer or on multiple computers that are located at one site or distributed across multiple sites and interconnected by a communication network.

Mobile devices can include handsets, user equipment (UE), mobile telephones (for example, smartphones), tab-lets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining charac-teristics of the mobile device's current environment. The sensors can include cameras, microphones, proximity sen-sors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second(s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The software may include a computer program, a code, an instruction, or a combination of one or more of them, which configure the processing device to be operated as desired or independently or collectively command the processing device. The software and/or data may be interpreted by a processing device or embodied in any tangible machines, components, physical devices, computer storage media, or devices to provide an instruction or data to the processing device. The software may be distributed on a computer system connected through a network to be stored or executed in a distributed manner The software and data may be stored in one or more computer readable recording media.

The method according to the exemplary embodiment may be implemented as a program instruction which may be executed by various computers to be recorded in a computer readable medium. At this time, the medium may continuously store a computer executable program or temporarily store it to execute or download the program. Further, the medium may be various recording means or storage means to which a single or a plurality of hardware is coupled and the medium is not limited to a medium which is directly connected to any computer system, but may be distributed on the network. Examples of the medium may include magnetic media such as hard disk, floppy disks and magnetic tapes, optical media such as CD-ROMs and DVDs, magneto-optical media such as optical disks, and ROMs, RAMS, and flash memories to be specifically configured to store program instructions. Further, an example of another medium may include a recording medium or a storage medium which is managed by an app store which distributes application, a site and servers which supply or distribute various software, or the like.

Although the exemplary embodiments have been described above by a limited embodiment and the drawings, various modifications and changes can be made from the above description by those skilled in the art. For example, even when the above-described techniques are performed by different order from the described method and/or components such as systems, structures, devices, or circuits described above are coupled or combined in a different manner from the described method or replaced or substituted with other components or equivalents, the appropriate results can be achieved. It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A computing device comprising:
   one or more memories; and
   one or more processors coupled to the one or more memories, the one or more memories storing instructions that are executable by the one or more processors, individually or in any combination, to cause the computing device to perform operations locally on the computing device including:
   receiving a media feed including at least one of an audio feed or a video feed;
   determining, based on the media feed and using an adaptive model that recognizes perceptual clues including at least one of context, phrasing, tone, or audiovisual cues without reliance on pre-tagged metadata or content fingerprints, a categorization of the media feed;
   determining, based on a set of information including real-time user-specific data comprising at least one of user location, calendar events, or vehicle data, a replacement media that is dynamically generated and personalized to the user;
   overriding the media feed with the replacement media based on the categorization wherein the overriding occurs without modifying the media feed at a server level; and
   enabling voice-driven interaction with the replacement media to allow user responses in real-time.

2. The computing device of claim 1, wherein the replacement media includes at least one of an audio file or a video file.

3. The computing device of claim 1, wherein the overriding includes reducing a volume of the media feed.

4. The computing device of claim 1, wherein the categorization indicates a start of an advertisement break in the media feed.

5. The computing device of claim 1, wherein the set of information includes at least one of: historical user behaviors, learned user preferences, user demographics, user location, or time of day.

6. The computing device of claim 1, wherein the set of information is retrieved from a central data server.

7. The computing device of claim 1, wherein the media feed is broadcast from a radio station to a radio.

8. The computing device of claim 1, wherein the media feed is broadcast from a distribution server to a television, and wherein the overriding the media feed includes providing an indication to the distribution server.

9. The computing device of claim 1, wherein the overriding the media feed includes:

configuring a content source server with a geographical boundary; and indicating user location to the content source server.

10. A method performed locally on a computing device comprising:

receiving a media feed including at least one of an audio feed or a video feed;

determining, based on the media feed and using an adaptive model that recognizes perceptual clues including at least one of context, phrasing, tone, or audiovisual cues without reliance on pre-tagged metadata or content fingerprints, a categorization of the media feed wherein the determining occurs locally on a computing device;

determining, based on a set of information including real-time user-specific data comprising at least one of user location, calendar events, or vehicle data, a replacement media that is dynamically generated and personalized to the user;

overriding the media feed with the replacement media based on the categorization, wherein the overriding occurs without modifying the media feed at a server level; and enabling voice-driven interaction with the replacement media to allow user responses in real-time.

11. The method of claim 10, wherein the replacement media includes at least one of an audio file or a video file.

12. The computing device of claim 10, wherein the overriding includes reducing a volume of the media feed.

13. The method of claim 10, wherein the categorization indicates a start of an advertisement break in the media feed.

14. The method of claim 10, wherein the set of information includes at least one of: historical user behaviors, learned user preferences, user demographics, user location, or time of day.

15. The method of claim 10, wherein the set of information is retrieved from a central data server.

16. The method of claim 10, wherein the media feed is broadcast from a radio station to a radio.

17. The method of claim 10, wherein the media feed is broadcast from a distribution server to a television, and wherein the overriding the media feed includes providing an indication to the distribution server.

18. The method of claim 10, wherein the overriding the media feed includes:

configuring a content source server with a geographical boundary; and indicating user location to the content source server.

19. A non-transitory computer-readable medium storing instructions that, when executed by one or more processors of a computing device, cause the computing device to perform operations locally on the computing device including:

receiving a media feed including at least one of an audio feed from a vehicle radio system;

determining, based on the media feed and using an adaptive model that recognizes perceptual clues including at least one of context, phrasing, tone, or audiovisual cues without reliance on pre-tagged metadata or content fingerprints, a categorization of the media feed;

determining, based on a set of information including real-time user-specific data comprising at least one of user location, calendar events, or vehicle data, a replacement media that is dynamically generated and personalized to the user;

overriding the media feed with the replacement media based on the categorization, wherein the overriding occurs without modifying the media feed at a server level; and enabling voice-driven interaction with the replacement media to allow user responses in real-time.

20. The non-transitory computer-readable medium of claim 19, wherein the set of information includes at least one of: historical user behaviors, learned user preferences, user demographics, user location, or time of day.

\* \* \* \* \*